J. B. TURNER.

Wheel Cultivator.

No. 31,682. 678,

Patented Mar. 12, 1861.

Witnesses:

Inventor:

UNITED STATES PATENT OFFICE.

J. B. TURNER, OF JACKSONVILLE, ILLINOIS.

IMPROVEMENT IN CULTIVATORS.

Specification forming part of Letters Patent No. 31,682, dated March 12, 1861.

*To all whom it may concern:*

Be it known that I, J. B. TURNER, of Jacksonville, in the county of Morgan and State of Illinois, have invented a new and Improved Cultivator; and I do hereby declare that the following is a full, clear, and exact description of the same, reference being had to the annexed drawings, making a part of this specification, in which—

Figure 1:
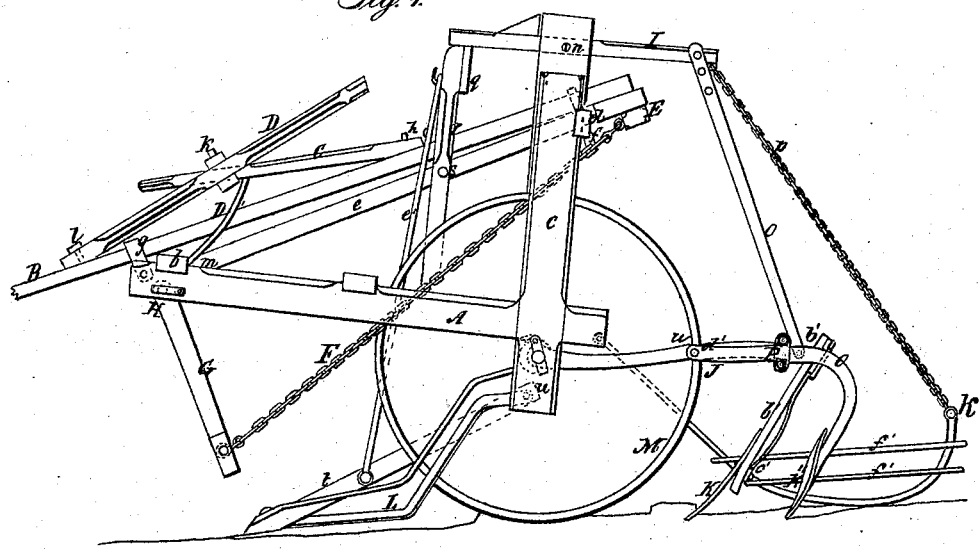
Figure 2:
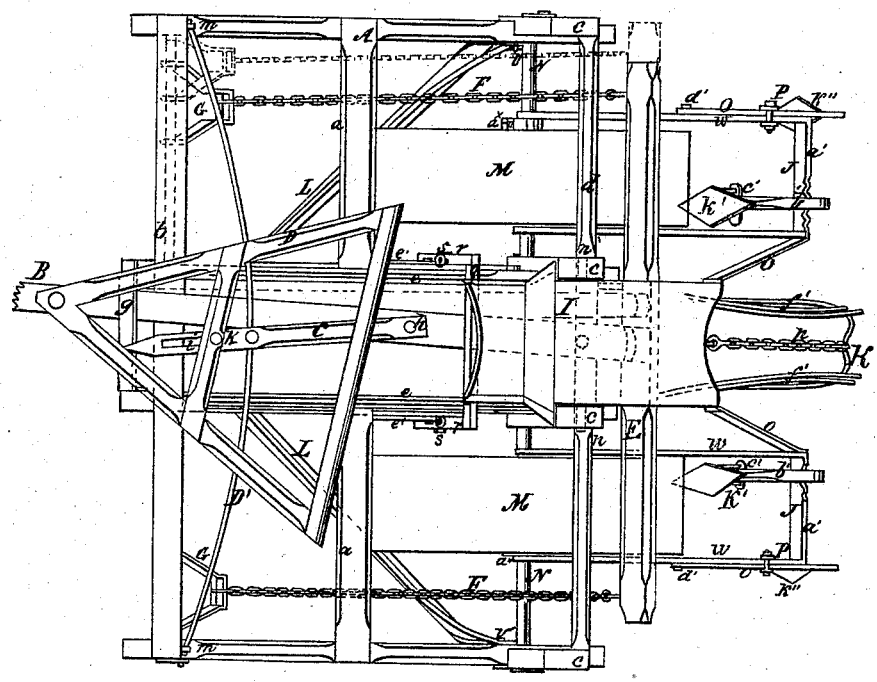

Figure 1 is a side view of my invention. Fig. 2 is a plan or top view of the same.

Similar letters of reference indicate corresponding parts in the two figures.

This invention has for its object the cultivation of crops in a mature state of growth without injuring the plants by any parts of the machine coming in contact with them, and also so constructing and arranging the frame that the same may be placed under the complete control of the operator, a guiding movement being allowed it independently of the team.

The invention has further for its object the complete cultivation of crops grown in hills or drills, the soil between the latter being perfectly acted upon, and at the same time the plants protected from clods of earth, trash, or substances which in the use of ordinary cultivators fall on them.

To enable those skilled in the art to fully understand and construct my invention, I will proceed to describe it.

A represents a rectangular frame, which is formed of two parts, $a\ a$, connected at their front parts by a cross-bar, $b$. At the back part of the frame A there are uprights $c$, two uprights being at the back end of each part $a$ of the frame A. These uprights are connected at their upper ends by a cross-bar, $d$. The inner uprights $c\ c$ of the parts $a\ a$ of the frame A are braced by inclined bars $e\ e$.

B is a draft-pole, the back part of which is attached by a pivot-bolt, $f$, to the cross-bar $d$. The draft-pole passes underneath a metal guide-bar, $g$, on the front part of the frame A. To the draft-pole B there is attached by a pivot or bolt, $h$, the back end of a bar, C, the front end of which is slotted longitudinally, as shown at $i$, said slot having a bolt, $k$, passing through it which secures a triangular frame, D, to the bar, the front end of said frame being attached by a pivot or bolt, $l$, to the draft-pole B. The bar C is connected or permanently attached to a curved bar, D′, which is secured to the frame A at each side, as shown at $m\ m$ in Fig. 2.

To the back part of the draft-pole B a doubletree, E, is attached, and each end of the doubletree is connected by a chain, F, to a stirrup, G, said stirrups being suspended on a rod, H, at the front part of the frame A and allowed to slide freely thereon, the draft chains or traces being connected to the stirrups.

Directly back of the triangular frame D is the driver's seat I. This seat is secured by pivots $n$ between the two inner uprights $c\ c$. The seat is allowed to work on its pivots $n\ n$, and to its back end cultivator-frames J J are connected by bars $o$. A guard-frame, K, is also connected to the back end of the seat by a chain, $p$. The front part of the seat I rests on a bar, $q$, the ends of which are attached to uprights $r\ r$, which are secured to the braces $e\ e$ by pivots $s$, and the bar $q$ therefore allowed to be moved backward or forward underneath or over the seat, and the back end of the latter adjusted at the desired point to keep the teeth $K'\ K''$ of the cultivator-frames in the ground or elevate them entirely above the ground, as may be desired.

To the lower end of each inner upright $c\ c$ a bar, $t$, is attached by a bolt or pivot, $u$, and to the front end of these bars $t$ curved scrapers or cutters L are attached, one to each. The back ends of these scrapers or cutters are attached to the lower ends of the outer uprights $c\ c$ by pivots $v\ v$. These scrapers or cutters extend in front of the drums or rollers M M on which the frame A is mounted. The rollers M M are fitted loosely on independent axles N N and secured thereto by set-screws $a^x$, so as to be capable of adjustment laterally on their axles N N.

The cultivator-frames J J are each formed of two bars, $w\ w$, connected at their back ends by a cross-bar, $a'$, on each of which a cultivator foot or standard, $b'$, is placed and allowed to slide laterally. The feet or standards $b'$ are cylindrical rods, and the teeth or plows K′ are attached to them by clamps $c'$, which admit of the teeth being raised or lowered on the rods or turned thereon, so that the earth may be thrown toward or from the plants. To the outer bar $w$ of each frame J there is attached by a pivot, $d'$, the front end of a curved bar, O. This bar O at its back end is curved in hook form, and has a cultivator tooth or plow, K", rigidly attached to it. The front parts of the bars O are slightly curved, and a sliding collar, P, connects each bar $w$ with its bar O, and by adjusting the collar P the teeth K" may be raised or lowered as desired, the curvatures of the bars $w$ producing such result.

The height of the cutters or scrapers L may be regulated by adjusting the bars $t$ by means of rods $e'$, which extend upward in front of the driver's seat.

The guard-frame K is of wire or rods bent upward at its front and back ends, as shown in Fig. 1, and provided with longitudinal bars or fenders $f'$ at each side. The front end of the guard-frame K is attached to the back end of the frame A by pivots $b^\times$.

From the above description it will be seen that as the machine is drawn along the driver from his seat I may give the frame A a lateral adjusting movement, either to the right or left, by actuating the frame D, and this movement of the frame is perfectly independent of the draft movement, the sliding stirrups G preventing the draft mechanism interfering. This arrangement places the implement under the complete control of the driver, the machine being capable of being nicely guided so as not to injure the plants. At the same time the cultivators may be elevated when required with the greatest facility by the driver adjusting the seat I.

The cutters or scrapers L level the ground and prepare smooth tracks for the rollers M M, which may be adjusted nearer together or farther apart on the axle N, as the height or size of the plants may require. The guard-frame K prevents clods of earth from falling upon the plants, and the cultivator-frames J are adjustable with the rollers M.

The machine is drawn along over the rows, the latter being between the two parts $a\ a$ of the frame A, and between the two sides of the guard-frame K.

Having thus described my invention, what I claim as new, and desire to secure by Letters Patent, is—

1. The arrangement of the frame A with the draft-pole B, triangular frame D, and bar C, substantially as shown, to admit of the independent lateral movement of the frame A, as set forth.

2. The arrangement, in the described connection with a cultivator, of the double-tree E and stirrups G G, connected by chains F, the stirrups being fitted loosely on the rod H, at the front part of the frame A, to prevent the draft mechanism interfering in the least with the adjusting movement of frame A, and to render the line of draft perfectly adjustable.

3. The combination of the hinged guard-frame K, chain $p$, and seat I, constructed, arranged, and operating in the manner and for the purposes set forth.

4. The combination of the curved bars O and $w$ and sliding collar P, constructed and operating, as described, to adjust the height of the plows K".

5. The employment or use of the adjustable cutters or scrapers L L, applied to the frame A and in front of the rollers M M, for the purpose set forth.

6. The arrangement of the driver's seat I with the cultivator-frame J J and guard-frame K, attached in connection with the adjustable bar $q$, as and for the purpose specified.

J. B. TURNER.

Witnesses:
C. W. GILLETT,
C. W. TURNER.